United States Patent
Howard et al.

[11] Patent Number: 6,067,591
[45] Date of Patent: May 23, 2000

[54] METHOD AND APPARATUS FOR AVOIDANCE OF INVALID TRANSACTIONS IN A BUS HOST CONTROLLER

[75] Inventors: John S. Howard; Brad W. Hosler, both of Portland, Oreg.

[73] Assignee: Intel Corporation, Santa Clara, Calif.

[21] Appl. No.: 09/168,374

[22] Filed: Oct. 8, 1998

[51] Int. Cl.⁷ .............................. G06F 13/00; G06F 3/00; H04L 12/403

[52] U.S. Cl. ........................... 710/100; 710/30; 370/470; 370/472

[58] Field of Search .............. 710/100, 30; 370/464–473

[56] References Cited

U.S. PATENT DOCUMENTS

| | | | |
|---|---|---|---|
| 4,454,508 | 6/1984 | Grow | 340/825.05 |
| 4,549,297 | 10/1985 | Nishimoto | 714/749 |
| 4,964,113 | 10/1990 | Geyer et al. | 370/452 |
| 5,307,351 | 4/1994 | Webster | 370/470 |
| 5,461,618 | 10/1995 | Chen et al. | 370/470 |
| 5,541,922 | 7/1996 | Pyhalammi | 370/462 |
| 5,805,598 | 9/1998 | Loney | 370/452 |

OTHER PUBLICATIONS

"Universal Host Controller Interface (UHCI) Design Guide," Mar. 1996, Rev. 1.1, (41 pages).

*Primary Examiner*—Ayaz R. Sheikh
*Assistant Examiner*—Sumati Lefkowitz
*Attorney, Agent, or Firm*—Kenyon & Kenyon

[57] ABSTRACT

A method and apparatus for ensuring frame integrity in a bus system are disclosed. In the disclosed system, each scheduled transaction is evaluated before execution to determine whether there is enough time in the frame to complete the transaction. By separately evaluating each transaction at the time of execution, held off transactions are not aborted if the frame ends before the transaction completes. Each transaction is evaluated by determining the approximate length of the transaction and comparing the approximate length to the number of byte times remaining in the frame. A step function is used to determine the approximate length by adding one of two possible constant values which take into account transaction overhead to the number of data bytes in the transaction, the selected constant value being dependent upon the number of data bytes, a smaller constant value being added for smaller transactions and a larger transaction value being added for larger transactions.

22 Claims, 5 Drawing Sheets

METHOD AND APPARATUS FOR AVOIDANCE OF INVALID TRANSACTIONS IN A BUS HOST CONTROLLER

FIELD OF THE INVENTION

The present invention is directed to control of a bus in a computer system. More particularly, the present invention is directed to the operation of a universal host controller interface to a universal serial bus in a computer system.

BACKGROUND OF THE INVENTION

The Universal Serial Bus (USB) is a half duplex single logical wire which permits relatively high speed serial communication between a host system bus and devices on the USB. The operations of the USB are generally well known in the art. Architectural details and signaling characteristics are explicitly defined in Universal Serial Bus Specification, Version 1.0, Jan. 19, 1996. Similarly, one possible host controller interface (UHCI) is defined for the interface between the USB and a host system bus. Details in that interface are set forth in Universal Host Controller Interface Design Guide, Revision 1.1., March 1996.

The USB permits four types of transfers: isochronous transfers, interrupt transfers, control transfers, and bulk transfers. Isochronous transactions are characterized by a constant fixed data rate between the USB device and the host and USB guarantees that a required maximum data rate can be transferred in each frame. USB does not require that these transactions occur at this maximum rate in every frame. Failed transactions are not retried. Interrupt transactions are characterized by small spontaneous transfers from a device. Like isochronous transactions, interrupt transactions have a guaranteed maximum data rate, but interrupt transactions are retired after limited retries due to data corruption or other errors. Control transactions are used to provide a control channel from the host to the USB devices through which control, status, and configuration information may flow and always consist of a set-up stage and zero or more data stages followed by a status stage where a stage consists of one or more transactions. Bulk transactions are characterized by guaranteed transmission of data between client and host under relaxed latency requirements.

The USB transfers data in frames. Every frame is one millisecond long and begins is with a start of frame packet. The host controller schedules pending transactions with isochronous transactions scheduled first, interrupt transactions next and control and bulk transactions following in turn. In general, scheduling always presumes a worst case transmission characteristic.

The USB Host Controller is responsible for maintaining frame integrity. In particular, it should never start a Device-to-Host transaction unless there is time left in the frame to complete the transaction. Transactions allow data transfer over the USB. Some number of transactions are moved over the bus in each frame. A frame schedule is used by the host controller to determine what specific transactions are moved in what frame. Different host controllers require different organization and control of frame schedules.

In general, frame schedules are constructed using transaction descriptors (TDs). TDs are data structures containing characteristics of the transaction requested on the USB. Even though four types of transfers exist on the USB, all TDs use the same format, with different transfer types distinguished by a number of control bits. The host controller fetches a TD and generates the proper transaction on the USB.

The Universal Host Controller Interface (UHCI) specification provides a programmable frame threshold that is used to determine whether to start a transaction. In effect, once the threshold has been exceeded, UHCI will not start any transaction, regardless of its size. This threshold has two settings: thirty-two bytes or sixty-four bytes. However, the programmable frame threshold does not provide an adequate mechanism for optimal transaction scheduling, particularly for transactions exceeding sixty-four bytes.

When the Host Controller fetches TDs from memory, PCI latencies can delay delivery of the TD. PCI latencies occur because of, inter alia, ordering rules, effects of concurrent bus transactions, and the inability to precisely predict when a PCI bus transaction will be completed. A problem may be created when the transaction data size is greater than sixty-four bytes and the TD fetch is completed a relatively short time before the end of the frame (e.g. before the threshold is traversed, but after the point when the transaction should have been started). A transaction for which TD delivery (and therefore initiation of the transaction) is delayed is considered held off. The Universal Host Controller Interface will start held-off transactions if the sixty-four byte threshold has not been reached. In those cases where the held-off transaction is a Read transaction and the data length is greater than sixty-four bytes, the failure (and recovery) side-effects are significant and always observable by the user.

Accordingly, there is a need for a mechanism to avoid starting held-off transactions which cannot be completed without violating frame integrity and are accordingly aborted, creating a noticeable disruption in bus performance.

SUMMARY OF THE INVENTION

According to an embodiment of the present invention, a determination is made as to whether a transaction should be executed in the current frame of bus system by determining whether there are enough byte times remaining in the current frame to execute the complete transaction. The number of byte times remaining in the frame is compared the transaction size, the transaction size being determined from the number of data bits in the transaction and a value relating to the change in transaction size caused by transaction processing overhead. If there are more byte times remaining in the frame than bytes in the transaction, the transaction is executed.

DETAILED DESCRIPTION

Figure 1:
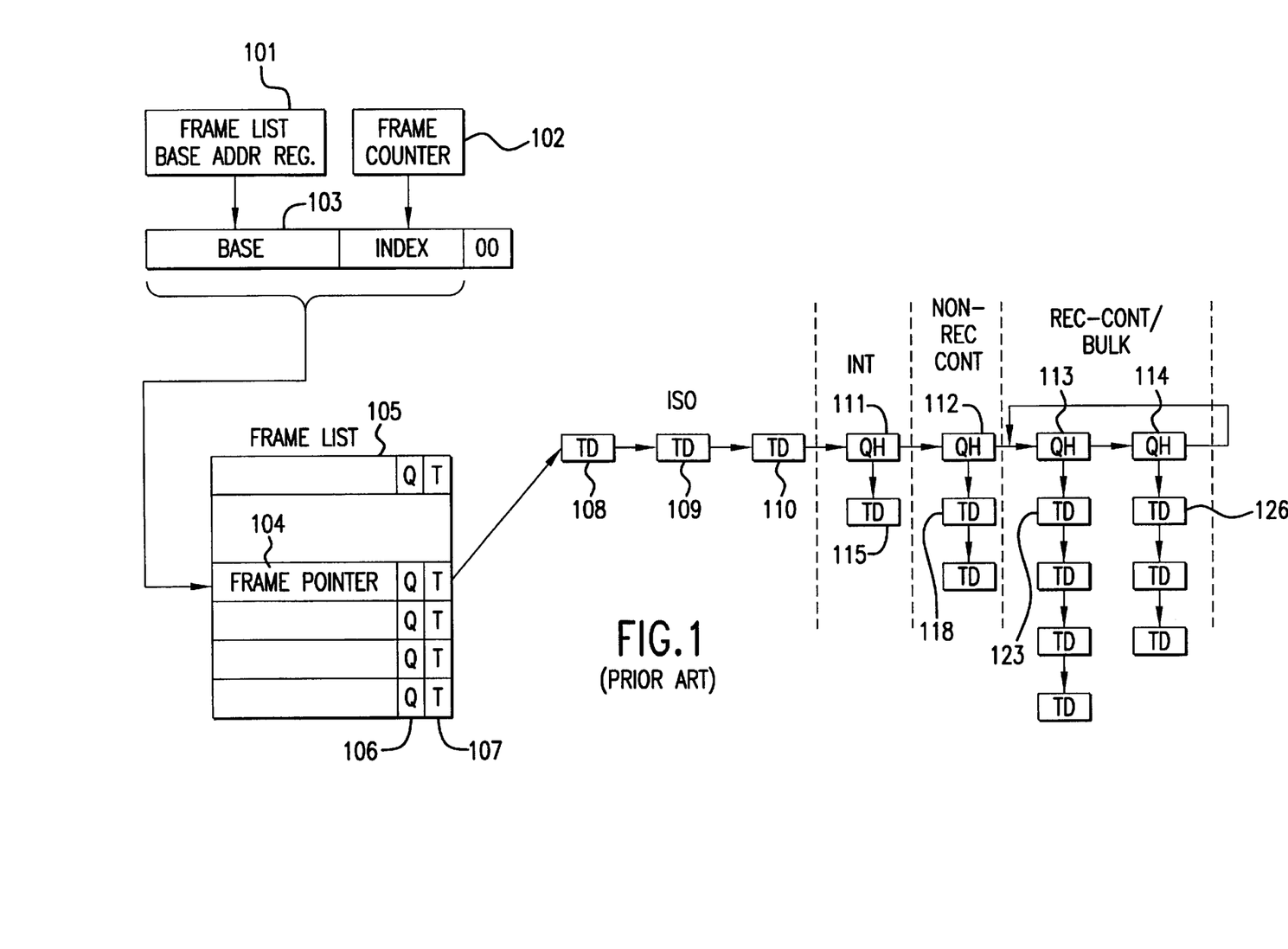
FIG. 1 is a diagrammatic representation of a prior art frame schedule.

FIG. 1 is a diagrammatic representation of an exemplary prior art frame schedule. Hardware register 101 provides a base address, and frame counter 102 provides an offset to create an address 103 of a frame pointer 104 in a frame list 105. Each entry of the frame list 105 includes two additional relevant bits and two unused bits in addition to a frame pointer. A T-bit 107 is used to indicate whether transactions are pending for the frame. A Q-bit 106 indicates whether a frame pointer points to transaction descriptor (TD) or a queue head (QH). TDs are data structures containing characteristics of the transaction requested on the USB. Even though four types of transfers exist on the USB, all TDs use the same format. Different transfer types are distinguishable by a number of control bits. QHs are data structures to support control, bulk, and interrupt transactions. Because data is guaranteed to have reliable delivery, such transactions must be queued to facilitate retries in the event a transaction is unsuccessful, or, in the case of control and bulk, must be deferred to a subsequent frame.

In executing the frame schedule, the host controller traverses horizontally through the isochronous TDs conducting corresponding transactions. In FIG. 1, frame pointer 104 points to isochronous TD 108, which in turn is linked to the isochronous TD 109, which is linked to isochronous TD 110. To be a valid schedule, all isochronous transactions and any interrupt transactions must be traversed during less than 90% of the frame time (all isochronous and interrupt transactions scheduled must be completed in the frame). Thus, the host controller driver creates the schedule assuming a worse case transmission rate and does not schedule more than the allowable amount of transactions.

If time is available in the frame after isochronous transactions corresponding to TDs 108–110 and the relevant transactions corresponding to interrupt and non-reclaimable control QHs 111, 112 occur, the remaining time will be used for reclaimable control or bulk transactions, corresponding to the TDs under QHs 113 and 114. This would typically take the form of fetching QH 113 from main memory identifying TD 123, fetching TD 123 and, subsequently, the data corresponding to TD 123 from main memory and sending that data across the USB. The QH link pointer is then followed to identify QH 114 which is retrieved from main memory, TD 126 is identified and fetched from main memory, and the data corresponding thereto is fetched from main memory and transmitted across the bus. Traversal of QHs continues following the QH link pointer until there is insufficient frame time for another transaction or no TDs are pending.

The Host Controller typically determines whether there is sufficient time remaining to execute another transaction. For transactions involving data packets of 64 bytes (or 32 bytes, depending upon the setting of bit 7 in the USB command register) or less, the Host Controller uses a preSOF time point to determine if there is enough time remaining in the frame to execute a transaction. In prior art systems, the scheduling software is solely responsible for ensuring that enough bandwidth remains to complete transactions greater than 64 bytes (or 32 bytes) within a time frame.

Figure 2A:
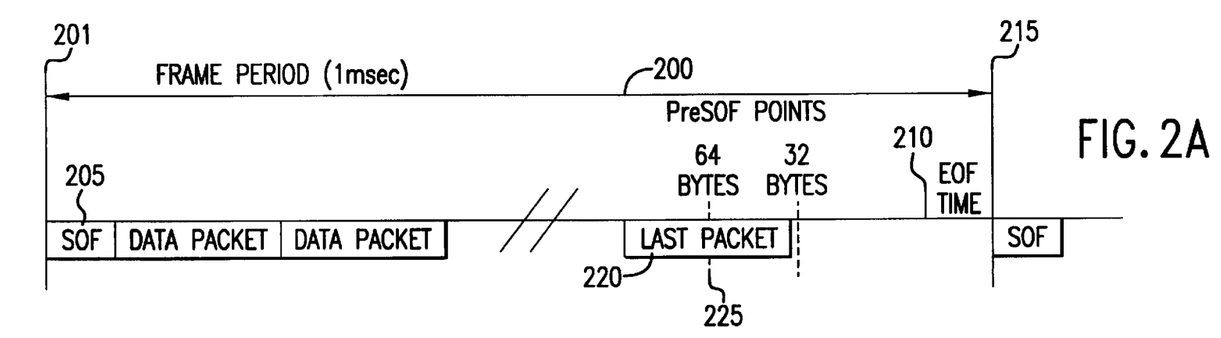
FIG. 2A is a graphical representation of frame period and transaction timing in a Universal Serial Bus Host Controller showing a transaction commenced before a PreSOF point in accordance with the prior art.
Figure 2B:
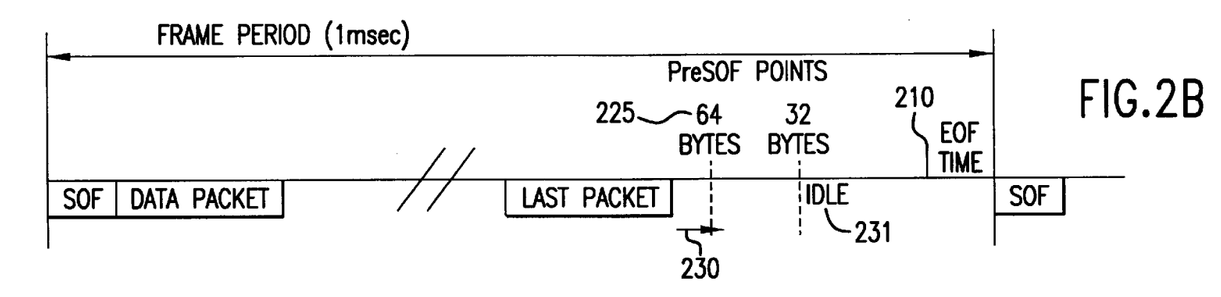
FIG. 2B is a graphical representation of frame period and transaction timing in a Universal Serial Bus Host Controller showing a transaction fetch commenced before a PreSOF point in accordance with the prior art.
Figure 2C:
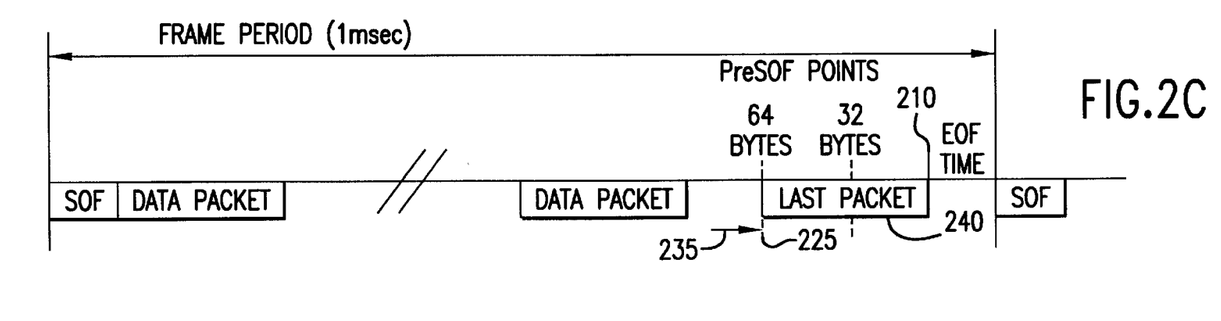
FIG. 2C is a graphical representation of frame period and transaction timing in a Universal Serial Bus Host Controller showing a transaction fetch completed before a PreSOF point in accordance with the prior art.

The preSOF point is used by the Host Controller to prevent a transaction that will not fit within the remaining time frame from being initiated. Referring to FIG. 2A, a one millisecond frame period 200 is shown. The first transaction after the frame period begins at 201 is a SOF (Start Of Frame) packet 205 generated by the Host Controller every millisecond. Data packet transfers are permitted until the End of Frame (EOF) time point 210 which occurs nears the end of the one millisecond time frame 215. As shown in FIG. 2A, if the transaction time for the last packet 220 is completed after the preSOF point 225, no other transfers are initiated and the Host Controller does not fetch the next transaction. Referring to FIG. 2B, if the preSOF point is reached while the Transfer Descriptor for the next transaction is being fetched, the transaction 231 is aborted by the Host Controller to prevent the transaction from extending past the EOF time 210. Referring to FIG. 2C, if a transaction is initiated by the Host Controller at 235, and started on the bus before preSOF point 225, then transaction 240 is completed, but is the last TD in the frame list executed.

For packets in excess of 64 bytes, the preSOF time point does not provide an adequate mechanism for scheduling transactions to ensure completion within the time frame. However, it is possible to use the expected length of the transaction (provided in the TD) in conjunction with the remaining time left in the frame to determine whether to start a transaction. The number of bit times left in a frame is precisely tracked by the Host Controller. Accordingly, with the TD information and the bit times left in a frame, it can be readily determined whether a transaction should or should not be started.

Although the TD contains the expected data length, it is expressed in terms of bytes. Moreover, the USB transmission protocol includes bit stuffing. The USB protocol specifies NRZI encoding of the bit stream, and an additional 0 bit is inserted in the physical bit stream after six consecutive 1 bits. Accordingly, actual bus occupancy in a USB is a function of the actual data and cannot be predicted precisely. Therefore, the decision to start must be based on worst-case bus occupancy. Worst-case bus occupancy occurs when there is maximum bit stuff and can be calculated in accordance with equation 1 below.

$$busOccupancy = transactionOverhead + numBytes + bitstuff\left(\frac{numBytes * 8}{6}\right) \quad \text{Draft}(1)$$

In an alternative embodiment of the present invention, Equation 1 may be executed for each transaction and the result compared to the number of bit times available for the current frame, which is available from the Host Controller. However, implementation of equation 1 requires a substantial number of gates and each execution would take a substantial number of clock cycles, time which may result in undesirable idle time on the USB, depending upon system timing.

Accordingly, it is preferable, for some implementations, to utilize software scheduling. As discussed above, Host Controller software prepares a schedule of transactions for the Host Controller and typically ensures that scheduled transactions do not violate frame integrity (i.e., every scheduled transaction is completed between the SOF and EOF). However, the prior art software scheduling does not adequately deal with transactions that are held off because of PCI latency delays.

Figure 3:
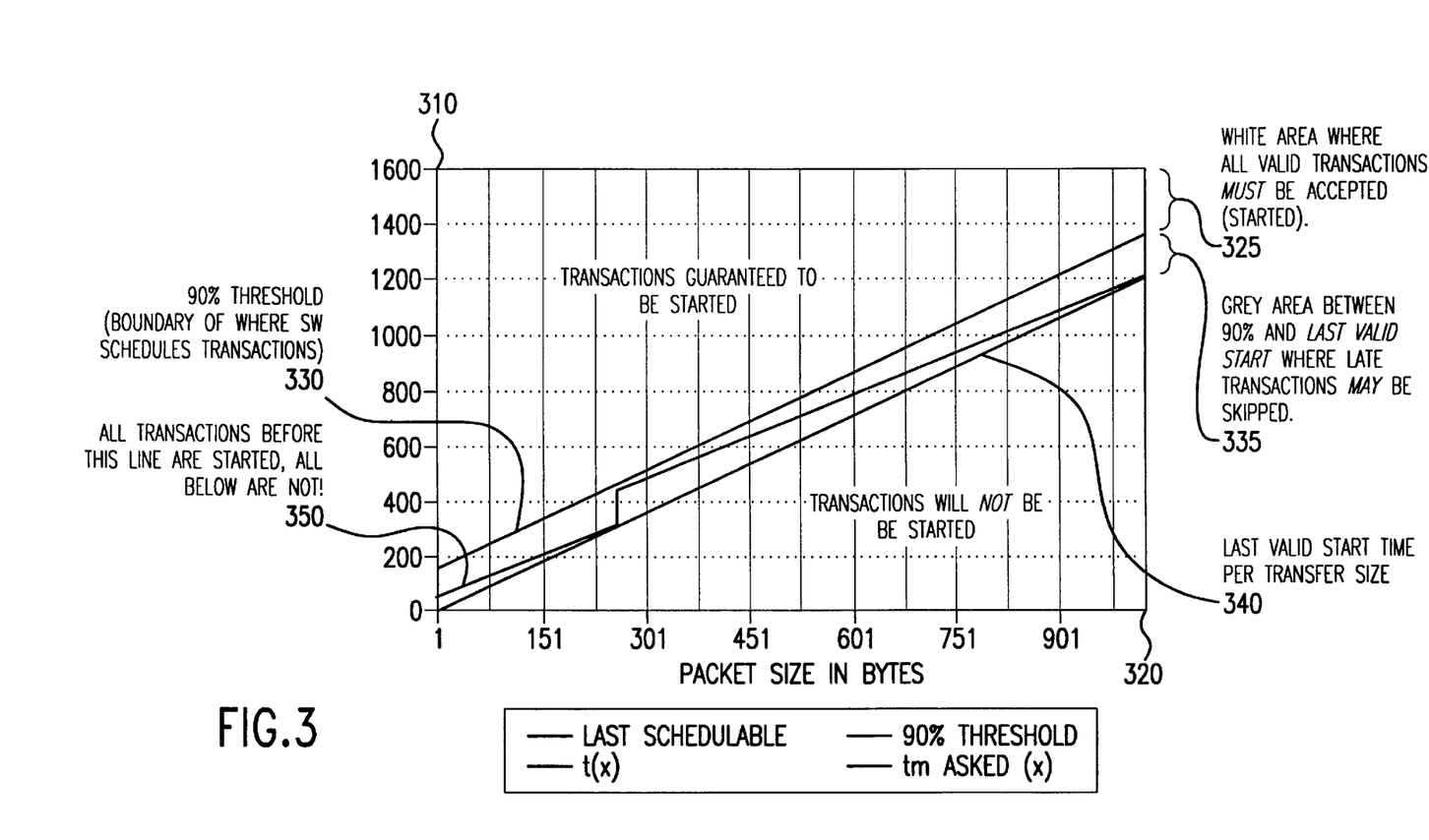
FIG. 3 is a graph representation of transaction scheduling in accordance with an embodiment of the present invention.

FIG. 3 is a graphical representation of the schedulable areas of a USB Frame with respect to transfer size. Vertical axis 310 represents the number of byte times available in a frame. Horizontal axis 320 represents the size of a USB transfer in bytes. The scheduling software schedules all transactions larger than 64 bytes in the first ninety percent of the one millisecond frame period, as indicated by the region 325 above 90% threshold 330. This 90% threshold 330 is not enforced by the hardware, but it is a requirement of the USB specification and is enforced by the scheduling software.

When a PCI hold-off occurs, the start times can drift beyond the 90% threshold established by software. The last chance threshold plot 340 on the graph represents the last valid start time(s) for transactions as a function of packet size. An embodiment of the present invention in which Equation1 is implemented and executed for each transaction can guarantee that all transactions delayed until last chance threshold 340 will be started in the frame. Thus, for example, a 401 byte packet scheduled for transfer when 600 byte times were remaining in the frame will still be transferred if the start of the transaction is held off until only 500 byte times are remaining in the frame period because of PCI latency.

Although PCI hold-offs do not occur with every transaction, the frequency with which they occur is considered to be high enough for the failure mode and recovery to be observable to a user in most circumstances. Accordingly, a hardware enhancement above and beyond the 64 byte limit is needed to improve the observable operation of the USB. In an embodiment of the present invention, the hardware implementation provides an optimal enhancement involving minimal complexity, execution speed, and gate count by optimizing scheduling the in the region 335 between 90% threshold 330 and last chance threshold 340.

In an illustrated embodiment, a step function 350 is implemented which allows all valid transactions and many held-off transactions to start. If a transaction's start time is held off beyond the 90% line, but is above the step function plot 350, then the Host Controller will commit to the transaction. If the start time is held-off past the step function plot 350, then the Host Controller skips the transaction. The step function 350 is based on the fact that the worst-case bit-stuff plus transaction overhead for the largest data packet is 171 bytes. A step function is used instead of a linear function that simply adds this worst case to the expected length, compares the sum to the actual number of bit times left in the frame and only starts the transaction if there are enough bit times left in the frame because this linear finction does not work for small data size packets. In the case of small data size packets, the linear function produces a plot line above the 90% threshold, which would result in valid transactions being skipped and undesirable idling of the USB.

In an embodiment of the present invention intended for use with a USB Host Controller, a single adder and comparator are implemented in hardware. In alternative embodiments, the add and compare functions may be implemented entirely in software or by some combination of software and hardware. A small constant value is added to the Maximum Length (MaxLen) field of a TD when the value of MaxLen is small (e.g., less than sixty-four bytes), and a larger constant value is used for all lengths greater than 255 bytes. The Host Controller uses the MaxLen value as a terminal count for the number of bytes fetched from memory for a transmit operation, which, in most cases, is the number of bytes actually transmitted. For read operations, the MaxLen value represents the maximum number of bytes the sending device should transmit.

Referring again to FIG. 3, the step function 350 is generated using two different constants that vary with packet size. All transactions of a specified length will be started, at the latest point, if the byte times left in the frame are above the line of step function 350. If, on the other hand, the step-function threshold has been exceeded, the particular transaction is simply skipped. In a preferred embodiment of the present invention, constants which are powers of two are utilized with byte size units, advantageously permitting the use of adder having a reduced size. A constant value of 64 is added to the expected length for transfers of 255 bytes or less, and a constant value of 192 is added to the expected length for transfers of more than 255 bytes. Advantageously, it is possible to readily determine whether transfer size exceeds 256 bytes as either bits 8 and/or 9 of the MaxLen field in the TD will be set.

In order to minimize the size of the adder, units of bytes are used with constants which are a power of two. For transfer sizes less than 256 bytes, a constant value of 64 ($0100\ 0000_2$) is added to the expected length. If the transfer size is larger than 256 bytes (as indicated by either bit 8 or 9 asserted in the Maximum Length field of a TD), then a constant value of 192 ($1100\ 0000_2$) is added to the expected length.

The present invention is readily adaptable to multiple transmission speeds such as are provided for by the USB protocol. The USB protocol has a full speed bandwidth of 12 megabits per second and a low speed bandwidth using a 1/8th speed clock with a bandwidth of 1.5 megabits per second. In the present invention, low speed bandwidth transactions use the larger constant operand of 192, even though the data size is 8 bytes as actual bus occupancy is greater than 8 times what it would be to transfer the same packet at full bandwidth speed.

Figure 4:
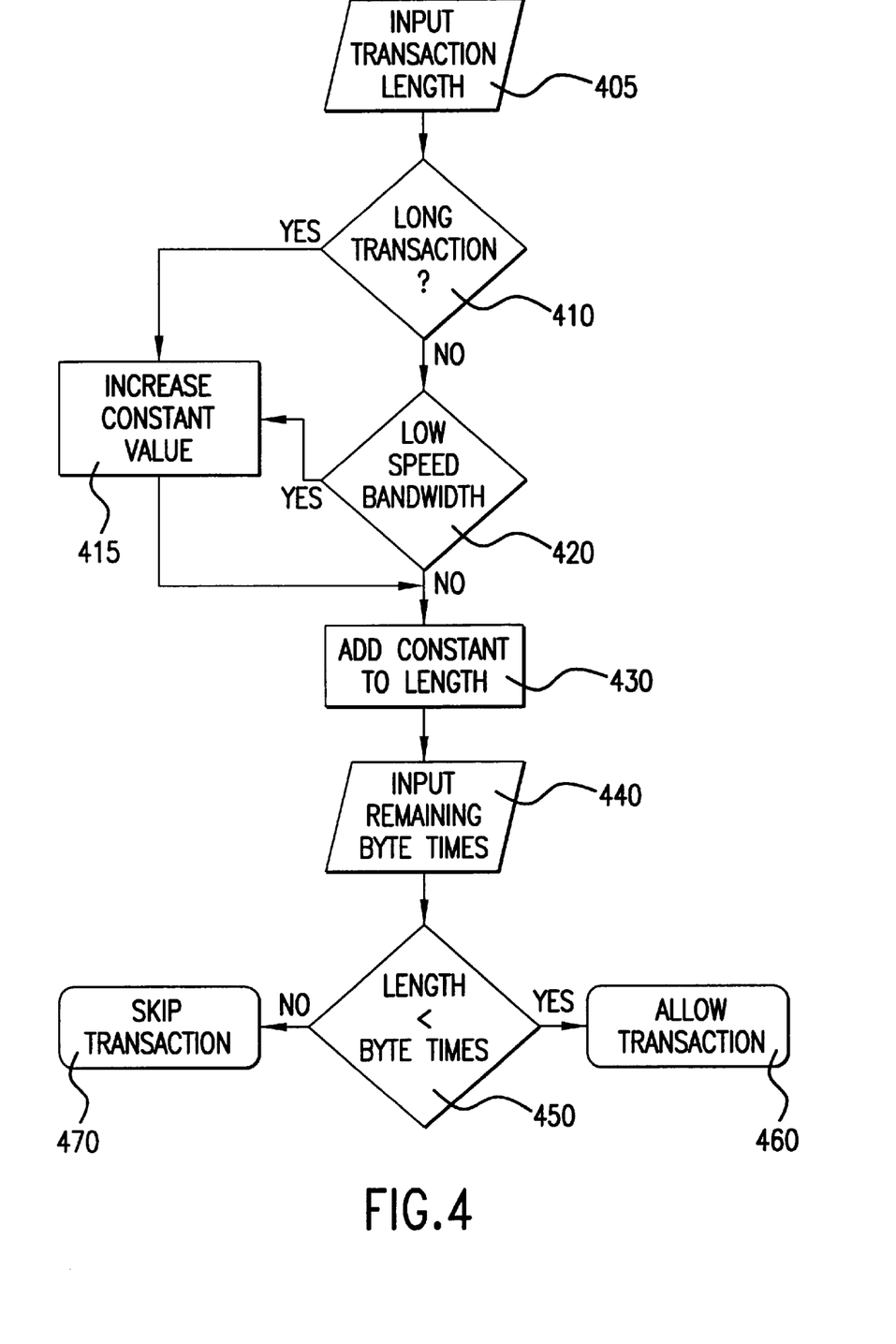
FIG. 4 is a flowchart representation of a method for avoiding commencement of invalid transactions in accordance with an embodiment of the present invention.

Referring to FIG. 4, operation of an embodiment of the present invention is illustrated in a flowchart. In the illustrated flowchart operation, the "constant" value is initialized to 64 (for USB, for other bus protocols, a different value may be preferable); the other values used for computation vary with circumstances and are evaluated during execution. The transaction length or packet size is input as shown by input/output block 405. In a preferred embodiment of the present invention intended for operation with a USB Host Controller, the transaction length is input from the maximum length field of the transaction descriptor. If the input transaction length is greater than 255 bytes, as shown by decision block 410, then the constant value is changed to 192 as shown by processing block 415. The value of 192 is considered suitable for the USB protocol, however, any value greater than the initial value of the "constant" may be used. If the packet is being transmitted using the low speed bandwidth, then the "constant" value is set to the higher value, as shown by decision block 420. This "constant" value is then added to the transaction length as shown by processing block 430. The number of remaining bit times in the frame is then input as shown by input/output block 440. By inputting the actual number of remaining bit times immediately before the transaction, rather than relying on bit time predictions during scheduling, the USB host controller can accurately ascertain whether sufficient time remains in the frame to conduct the transaction as shown by decision block 450. If there is enough time left in the frame, then the Host Controller allows the transaction to proceed as shown by block 460. If, however, there is not enough time, the transaction is skipped (or delayed) as shown by block 470. The process is repeated for each transaction, thereby ensuring that only transactions which can be completed without violating frame integrity are allowed by the USB Host Controller.

Figure 5:
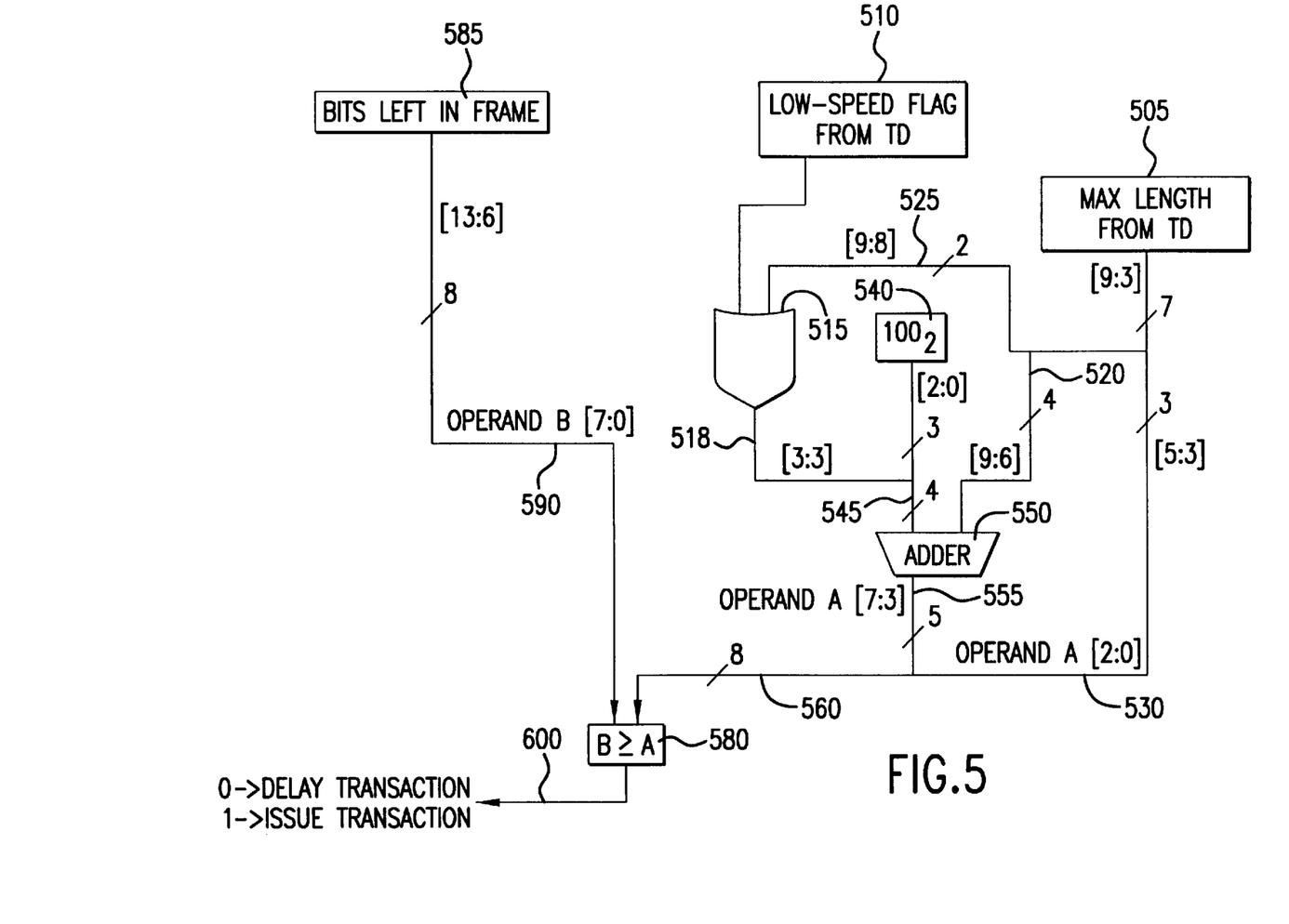
FIG. 5 is a schematic representation of a transaction decision circuit in accordance with an embodiment of the present invention.

Referring to FIG. 5, a hardware implementation of an embodiment of the present invention is illustrated schematically. In the embodiment of the present invention illustrated, circuit complexity and device size are minimized by converting all values from bits to bytes using quantization (truncation of the low order bits). Accordingly, the circuit may be implemented using only the following logic circuits: a four bit adder, an eight bit comparator and a three input OR gate.

In the illustrated embodiment, the transaction length (in bytes) is received from the Maximum Length field in the Packet Header in the Transfer Descriptor 505. Although 10 bits are required to fully account for the maximum number of bytes permitted in a packet by the USB specification ($1023_{10}$ or $3FE_{16}$), only the 7 most significant bits (of the 10 bits) are shifted out of the Transaction Descriptor in order to reduce circuit complexity. A hexadecimal value of $3FE_{16}$ corresponds to a 1023 byte transaction because a hexadecimal value of $000_{16}$ is defined as corresponding to a one byte transaction in the MaxLen field of the Transaction Descriptor. The omitted bits are treated as don't care bits during the comparison calculation. The four most significant bits 520 of the MaxLen 505 form the first operand (augend) of four bit adder 550. The two most significant bits 525 are simultaneously coupled to two inputs to three input OR gate 515, and the three least significant bits 530 are concatenated with the five bit output sum 555 of adder 550 to form the eight bit Operand A 560 to comparator 580.

In addition to the Maximum Length field, the Low Speed Device (LS) Flag 510 is also received from the Transfer Descriptor Control Field. The LS Flag provides a third input to three input OR gate 515, the other two inputs being the two most significant bits 525 of MaxLen 505. The output 518 of OR gate 515 is concatenated with three bit constant 540 to form the second operand (addend) of four bit adder 550. The OR operation permits the constant value to be efficiently increased when either the eighth or ninth bit in the MaxLen field is a one, indicating a large transaction, or when the transaction is to be conducted at low speed (as indicated by the LS flag).

The augend 520 formed by the most significant bits from the MaxLen field of the Transaction Descriptor and the addend 545 formed by concatenating $x100_2$ with the output of OR gate 515 are added to form the five most significant bits of Operand A 560 of comparator 580. The number of byte times left in a frame form Operand B 590 of comparator 580. In the illustrated embodiment, the USB bus engine provides a counter value indicating the number of bit times 585 left in a frame. The number of bit times is converted into byte times by ignoring the three least significant bits (in effect shifting right three times). In addition, the number of byte times left in the frame 585 is further aligned with the modified number of bytes in the transaction by ignoring the next three least significant bits. In an embodiment of the present invention where the USB Host Controller separately provides for transactions having less than 64 bytes (using the preSOF point), it is only necessary to provide additional complexity for transactions exceeding that threshold. The number of byte times left in the frame 590 is compared to the number of bytes in the transaction 560 by comparator 580 and a transaction is issued only if operand B 590 is greater than or equal to operand A 560.

Accordingly, a method and apparatus are provided by which a bus controller can ensure frame integrity is maintained by evaluating whether enough time remains in the frame to complete a transaction prior to issuing the transaction. By operating in conjunction with the Host Controller hardware and the scheduling software, the present invention provides the capability of ensuring frame integrity for a wide variety of transactions (to and from interconnected devices) and transaction sizes with minimum complexity and without delaying transactions. Moreover, the present invention is readily adaptable to a variety of bandwidths and operating parameters.

What is claimed is:

1. A method for determining whether to execute a transaction within a frame having a plurality of byte times on a bus system having a host controller, said method comprising the steps of:

determining the number of remaining byte times in the frame;

determining a first transaction length;

determining a constant first length modifier which takes into account transaction overhead;

determining a second transaction length from said first transaction length and said first length modifier;

comparing said number of remaining byte times in the frame and said second transaction length; and executing said transaction when said number of remaining byte times exceeds said second transaction length.

2. The method for determining whether to execute a transaction of claim 1 further comprising the step of executing said transaction when said number of remaining byte times equals said second transaction length.

3. The method for determining whether to execute a transaction of claim 1 wherein said first transaction length is the number of data bytes to be transferred during the transaction.

4. The method for determining whether to execute a transaction of claim 3 wherein said first length modifier is proportional to transaction overhead.

5. The method for determining whether to execute a transaction of claim 3 wherein said first length modifier is proportional to transaction overhead and bit stuffing.

6. The method for determining whether to execute a transaction of claim 3 wherein said first length modifier is proportional to worst case bus occupancy.

7. The method for determining whether to execute a transaction of claim 1 wherein said step of determining a first length modifier comprises:

assigning a first value to said first length modifier;

determining whether said first transaction length exceeds a first transaction length limit; and assigning a second value to said first length modifier if said first transaction length exceeds said first transaction length limit.

8. The method for determining whether to execute a transaction of claim 7 wherein said first value is a constant.

9. The method for determining whether to execute a transaction of claim 7 wherein said first transaction length is a multiple bit binary number and said step of determining whether said first transaction length exceeds a first transaction length limit comprises evaluating the most significant bit of said multiple bit binary number.

10. The method for determining whether to execute a transaction of claim 9 wherein said step of determining whether said first transaction length exceeds a first transaction length limit farther comprises evaluating a next most significant bit of said multiple bit binary number.

11. The method for determining whether to execute a transaction of claim 7 wherein said first length modifier is a multiple bit binary number and said step of assigning a second value to said first length modifier if said first transaction length exceeds said first transaction length limit comprises setting the most significant bit of said multiple bit number.

12. The method for determining whether to execute a transaction of claim 1 wherein said bus operates at one of a low speed and a high speed, and said step of determining a first length modifier comprises:

assigning a first value to said first length modifier;

determining whether said transaction will be conducted at low speed; and assigning a second value to said first length modifier when said bus transaction is conducted at low speed.

13. An apparatus for generating a transaction execution signal in a serial bus system, said apparatus comprising:

a first input buffer coupled to a transaction length register;

an adder having a first input, a second input, and an output, said first input connected to said first input buffer;

a logical OR gate having first and second inputs and an output, said first and second inputs being connected to said first input buffer and said output being connected to said second adder input;

a first register connected to said second adder input;

a comparator having a first input, a second input, and an output, said first input being connected to said adder output and said first input buffer, and said output forming said transaction execution signal; and a second input buffer coupled to a time remaining register, said second input buffer being connected to said second input of said comparator.

14. The apparatus of claim 13 wherein said logical OR gate has a third input and said apparatus further comprises a third input buffer coupled to a low speed flag, said third input buffer being coupled to said third OR gate input.

15. The apparatus of claim 13 wherein said serial bus system is a Universal Serial Bus system and said transaction length register stores the number of data bytes in a transaction as indicated by a maximum length field in a transaction descriptor.

16. The apparatus of claim 13 wherein said serial bus system is a Universal Serial Bus system and said time remaining register stores the number of bit times remaining in the current frame.

17. The apparatus of claim 13 wherein said first register is a three bit register, the three bits forming the least significant bits of a four bit operand applied to said second input of said adder.

18. The apparatus of claim 13 wherein said adder has four bit inputs and a five bit output, said five output bits forming the most significant bits of a first operand applied to said first input of said comparator.

19. A method for determining whether enough time remains in a frame to execute a bus transaction at the time of transaction execution, said method comprising the steps of:

determining the approximate transaction length in bytes by:

determining the number of data bytes in the transaction;

adding a constant number of bytes which takes into account transaction overhead;

determining the number of byte times remaining in the frame;

comparing said approximate transaction length to said number of byte times remaining in said frame;

responsive to said comparison, executing said transaction when said number of byte times remaining in said frame equals or exceeds said approximate transaction length.

20. The method of claim 19 wherein said step of adding a constant number of bytes comprises:

adding one of a first constant number of bytes or a second constant number of bytes to said number of data bytes in the transaction.

21. The method of claim 20 wherein said second constant number of bytes is added to said number of data bytes in the transaction to determine the approximate transaction length when said number of data bytes exceeds a threshold value.

22. The method of claim 20 wherein said second constant number of bytes is greater than the worst case number of bytes added to a transaction by bit-stuffing and transaction overhead.

* * * * *